Aug. 26, 1930.  G. M. KALER  1,773,899
SCALE MAGNIFYING ATTACHMENT FOR RULERS
Filed June 21, 1929
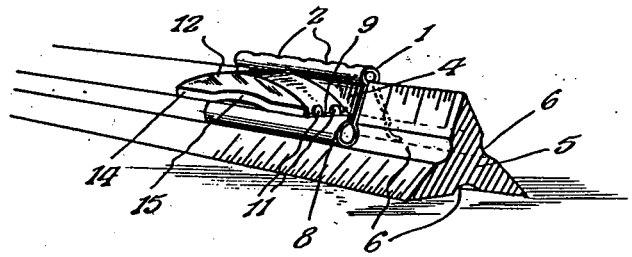
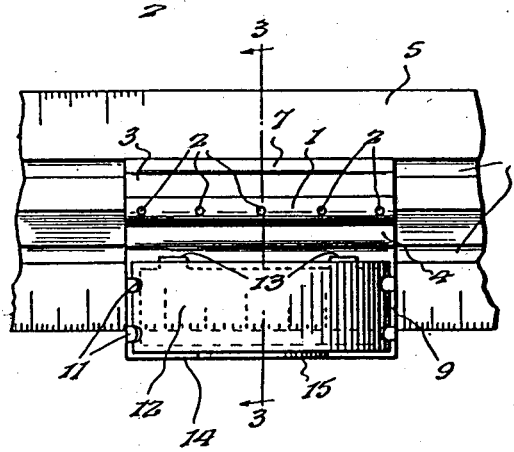
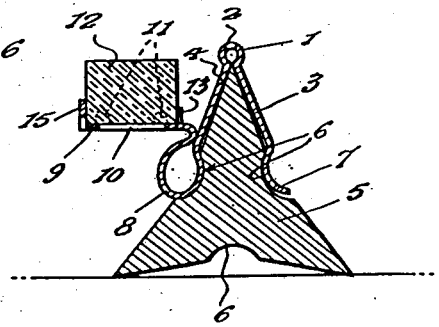
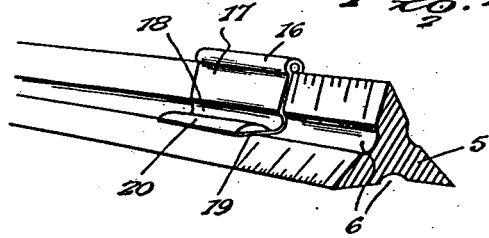
Inventor
G. M. Kaler.
By Lacey & Lacey, Attorneys Patented Aug. 26, 1930

1,773,899

UNITED STATES PATENT OFFICE

GEORGE M. KALER, OF SAN ANTONIO, TEXAS.

SCALE MAGNIFYING ATTACHMENT FOR RULERS

Application filed June 21, 1929. Serial No. 372,751.

This invention relates to an attachment for use upon a scale such as used by engineers and architects and more particularly to a magnifying device adapted to be applied to a scale and by means of which a fine scale marking may be easily read.

Scales which are used by architects, engineers and draftsmen who draw plans and working drawings according to scale are not only provided with inch markings and fractions thereof similar to other rules but also have scale markings provided thereon showing an inch or more divided into very small fractions of an inch. In some cases the inch divisions are so fine that it is difficult for an engineer or architect to use the scale without causing eye strain, and, therefore, one object of this invention is to provide an attachment including a magnifying glass which may be disposed over scale markings on a scale and thereby allow the markings to be magnified so that they may be easily seen and a plan or diagram properly drawn.

Another object of the invention is to permit the attachment to be very easily applied to a scale of a conventional construction and firmly held thereon while at the same time allowing it to be easily removed and transferred to another.

Another object of the invention is to so form the attachment that it may not only be easily applied to a scale and firmly held thereon but also allow it to be slid longitudinally upon a scale and thereby adjusted so that it may be disposed above a portion of a scale having desired inch divisions marked thereon.

The invention is illustrated in the accompanying drawing, wherein

Figure 1 is a perspective view showing the attachment applied to a conventional form of engineer's scale, Fig. 2 is a top plan view of the attachment together with a portion of the scale to which it is applied, Fig. 3 is a transverse sectional view taken on the line 3—3 of Fig. 2, and Fig. 4 is a perspective view similar to Fig. 1 and showing a modified form of the attachment.

This improved scale attachment consists of a body portion or clamp adapted to be applied to a scale and carrying a shelf extending so that it may be disposed over inch markings of the scale and support a magnifying glass through which scale markings may be easily read. The clamp and shelf are formed from a sheet of resilient metal. This sheet is bent intermediate its length to form a bead 1 which is substantially circular in cross section, as shown in Fig. 3, and openings 2 are formed in the sheet so that it may be easily bent to form the bead and also provide a roughened surface so that the device may be easily slid longitudinally. The portions of the sheet which extend from the bead form arms 3 and 4 of the clamp, and these arms extend in diverging relation to each other so that they may properly straddle a scale 5. The scale 5 is of the type ordinarily used by architects, engineers and mechanical draftsmen and is substantially triangular in cross section with its faces formed with longitudinally extending grooves or recesses 6. The free end portion of the arm 3 is bent to form a jaw 7 which is arcuate in cross section so that it may fit snugly into one of the grooves 6 of the scale and at the free end of the arm 4 the strip from which the clamp is formed is bent to provide a jaw 8. This jaw 8 forms substantially a complete circle in cross section, as shown in Fig. 3. After forming the jaw 8 the strip is bent to provide a shelf 9 which projects transversely from the arm 4 and this shelf is cut out for the greater portion of its length and width, thereby providing a sight opening 10 bordered by bars or strips along its ends and inner and outer sides. Tongues 11 extend from the end bars of the shelf to engage the ends of a magnifying glass 12 which rests upon the shelf and similar tongues 13 extend upwardly from the inner side bar. The outer side bar carries a flange 14 which extends upwardly along the outer side edge of the glass and the intermediate portion of this flange projects upwardly, as shown at 15, in order to more securely retain the glass in place. It will thus be seen that the glass will be firmly held upon the shelf in covering relation to the sight opening and this glass will be supported directly over the scale markings of a scale in proper focus thereto so that by looking through the magnifying glass the scale markings will be greatly enlarged. This will permit an architect or draftsman to easily read a scale divided into very fine inch divisions and allow drawings to be made upon a small scale without causing eye strain. By referring to Figs. 1 and 3, it will be seen that the device may be very easily applied to a scale and firmly held thereon and that by grasping the bead 1 the clamp may be easily detached from the scale. It will be also apparent that the openings form a roughened surface so that by placing a finger against the bead the device may be easily slid longitudinally to an adjusted position upon the scale.

In Fig. 4, there has been shown a modified form of the attachment. In this form the clamp is also formed of sheet metal and includes a bead 16 corresponding to the bead 1. Arms 17, corresponding to the arms 3 and 4, project from the bead 16 and each is bent to provide a jaw 18 adapted to engage in the grooves or recesses 6 of the scale. Instead of having one of the jaws form a complete circle, as shown at 8 in the previous disclosure, this form of the attachment is only bent sufficiently to form an arcuate jaw similar to the jaw 7 and is then extended outwardly to form a shelf 19 which will project from the lower edge of the groove in the scale instead of above the groove. Therefore, the magnifying glass 20 carried by the shelf will be disposed closer to the scale markings of the scale. This is desirable as many persons hold a magnifying glass closer than others do when using it.

Having thus described the invention, I claim:

1. A scale magnifying attachment for rulers comprising a clamp adapted to straddle a portion of a ruler and having gripping arms diverging from each other and having portions bent to form jaws adapted to engage in recesses of a ruler, a shelf extending from one arm and consisting of an open frame having side and end bars, a magnifying glass resting upon said bars, and tongue extending upwardly from said bars and engaging said glass to secure the glass in place.

2. A scale magnifying attachment for rulers comprising a clamp adapted to straddle a portion of a ruler and having gripping arms diverging from each other and having portions bent to form jaws adapted to engage in recesses of a ruler, one arm having its free end portion bent to form a shelf projecting transversely from the arm and the shelf being cut to form a sight opening bordered by end bars and inner and outer side bars, a magnifying glass resting upon said bars in covering relation to said sight opening, and means to secure said glass upon said bars.

3. A scale magnifying attachment for rulers comprising a clamp adapted to straddle a portion of a ruler and having gripping arms diverging from each other and having portions bent to form jaws adapted to engage in recesses of a ruler, one arm having it free end portion bent to form a shelf projecting transversely from the arm and the shelf being cut to form a sight opening, and a magnifying glass secured upon said shelf in covering relation to the sight opening.

4. A scale magnifying attachment for rulers comprising a sheet of resilient metal bent in spaced relation to one end to form a clamp having a bead and arms diverging therefrom, said arms having portions bent to form jaws to engage in recesses of a ruler and one having its free end portion bent to form a shelf extending from its jaw transversely away from the arm, said shelf being cut to define a sight opening, and a magnifying glass secured upon said shelf in covering relation to the sight opening.

5. A scale magnifying attachment for rulers comprising a sheet of resilient metal bent in spaced relation to one end to form a clamp having a bead and arms diverging therefrom, said arms having portions bent to form jaws arcuate in cross section and adapted to engage in recesses of a ruler and retain the device in engagement with a ruler for movement longitudinally thereof, the free end portion of one arm being bent to form a shelf projecting from its jaw transversely of the arm, said shelf being cut to form a sight opening, and a magnifying glass secured upon said shelf in covering relation to the sight opening.

In testimony whereof I affix my signature.

GEORGE M. KALER. [L. S.]